Oct. 26, 1937.  W. F. GROENE  2,097,096
TOOL FEEDING MECHANISM FOR LATHES
Filed Jan. 21, 1937  2 Sheets-Sheet 1
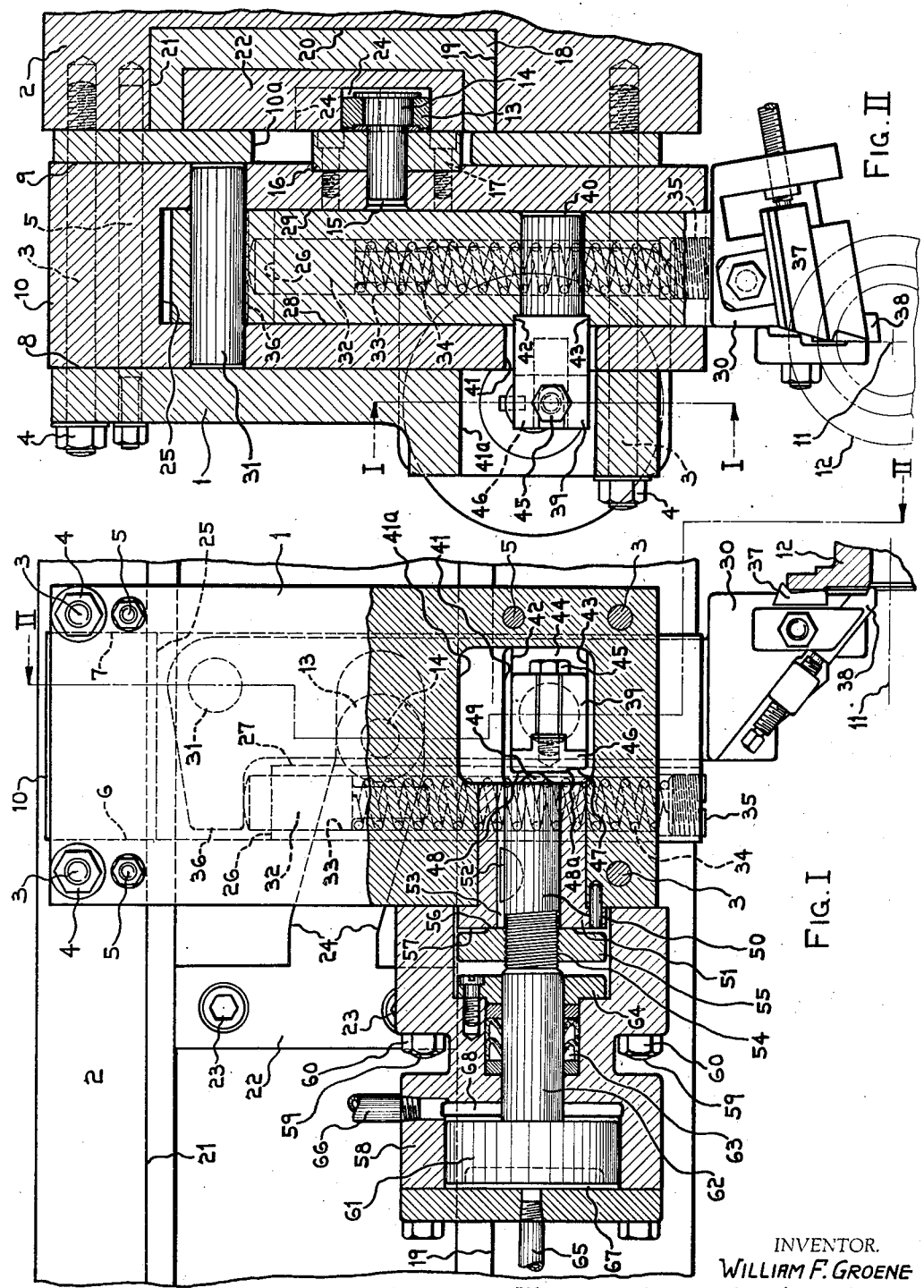
INVENTOR.
WILLIAM F. GROENE
BY Willard L. Groene
ATTORNEY.

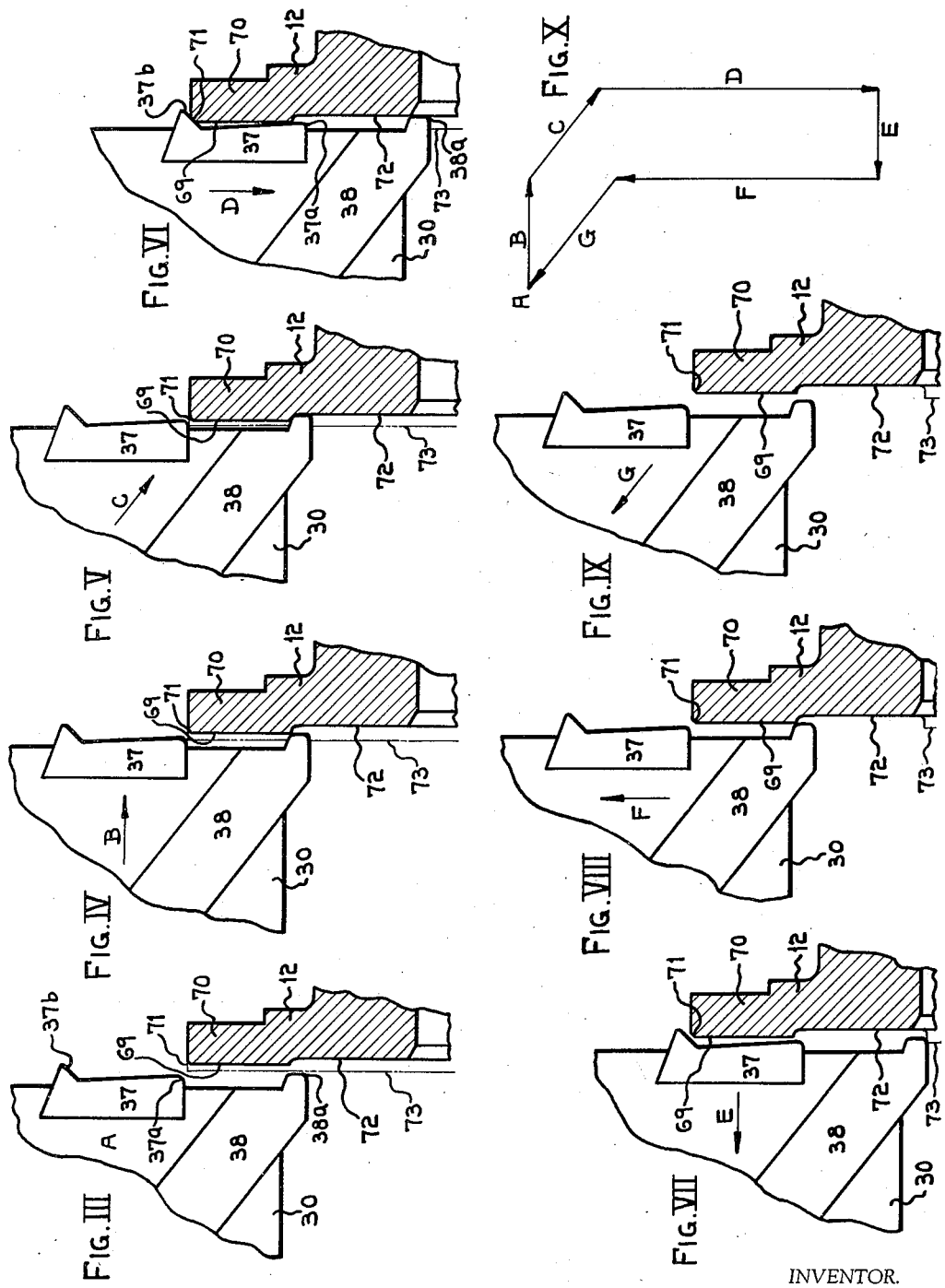

Patented Oct. 26, 1937

2,097,096

UNITED STATES PATENT OFFICE 2,097,096

TOOL FEEDING MECHANISM FOR LATHES

William F. Groene, Cincinnati, Ohio, assignor to The R. K. LeBlond Machine Tool Company, Cincinnati, Ohio, a corporation of Delaware Application January 21, 1937, Serial No. 121,508

13 Claims. (Cl. 82—21)

My invention pertains to tool feeding mechanism for cutting tools for lathes. More specifically my invention comprises a novel tool actuating device particularly adapted to feeding tools for machining the flange end of crankshafts for internal combustion engines.

An object of my invention is to provide a tool feeding device for facing operations on a work piece in a lathe which incorporates a tool relief mechanism to prevent scarring of the finished face upon return of the cutting tool to initial starting position.

Another object of my invention is to provide a tool feeding device wherein cutting tools are fed relative to a work piece for machining a face thereon and for machining a recess or counterbore in said face.

Another object is to provide a tool feeding device with cutting tools adapted to do facing operations on a work piece, mechanical means to actuate said tools for feeding operations, and hydraulically operated tool relief means.

A still further object is to provide tool feeding mechanism for machining the outside face and chamfering the flange and for counterboring the face of the flange of a crankshaft.

Further objects will appear from a description of the drawings in which:

Figure I is a plan view partly in section on line I—I of Figure II showing a tool feeding device with hydraulically operated tool relief means for machining the flange of a crankshaft.

Figure II is a vertical section on line II—II of Figure I.

Figure III shows the relative position of the work and tools at initial starting position.

Figure IV shows the relative position of the work and tools after the operation of the tool relief mechanism to bring the tools to cutting position.

Figure V shows the relative position of the work and tools at the beginning of the tool feeding movement.

Figure VI shows the relative position of the work and tools at the completion of the tool feeding movement.

Figure VII shows the relative position of the work and tools after the operation of the tool relief mechanism to withdraw the tools from cutting position.

Figure VIII shows the relative position of the work and tools when part-way withdrawn from the work.

Figure IX shows the final stage of tool movement back to the initial starting position of Figure III.

Figure X is a diagrammatic layout of the path of travel of the cutting tools relative to the work piece.

The general arrangement of the mechanism is shown in Figures I and II and comprises a housing 1 fixed to the frame 2 of a lathe by means of the usual studs 3, nuts 4, and dowel pins 5. Slidably mounted in the guideways 6, 7, 8, and 9 in the housing 1 is the tool carrier block 10 adapted to reciprocatory movement perpendicular to the axis of rotation 11 of the work piece 12. Means are provided for reciprocating the block 10 from the usual feeding mechanism of the lathe comprising a roller 13 rotatably mounted on a stud 14 fixed in the bore 15 of the block 10 and passing through the slot 10a of housing 1. A block 16 also secured to block 10 by suitable screws 17 serves to give added support to the stud 14 adjacent the roller 13 and to facilitate assembly of this mechanism in the housing 1. A cam plate 18 slidably mounted in guideways 19, 20, and 21 formed in the frame of the lathe and reciprocated therein by the lathe feed mechanism, has a cam 22 fixed thereto by screws 23 and having an angular cam slot 24 adapted to engage each side of the roller 13 so that upon reciprocation of the cam plate 18 by the lathe feed mechanism the block 10 will be correspondingly reciprocated in the housing 1.

In a slotted portion bounded by the surfaces 25, 26, 27, 28, and 29, formed in the block 10 is pivotally mounted a tool holder 30 on a pin 31 fixed in the block 10 and accurately guided against axial movement of pin 31 by surfaces 28 and 29 of the block 10. A plunger 32 slidably mounted in the bore 33 of block 10 is yieldingly urged outward from surface 26 by an appropriate spring 34 retained in bore 33 by the usual threaded plug 35 and bears against a lug 36 formed integral with the tool holder 30 to normally swing the tool holder so that its outer tool carrying end, having the tools 37 and 38 appropriately mounted thereon, is moved substantially axially away from the face being turned on a work piece 12.

Fixed on the tool holder 30 is an abutment pin 39 tightly fitted in the bore 40 and having its squared upper end projecting through the slot 41 in the block 10 and slot 41a in housing 1 and also snugly fitting between the faces 42 and 43 of slot 44 machined in the tool holder 30. Securely fixed to abutment pin 39 by screw 45 is the feed control cam 46 which has variously extending surfaces 47 and 48 of a character determined by the nature of the face to be machined on the work piece, the faces being adapted to engage the projecting end 49 of the tool relief plunger 50 whereby reciprocation of the block 10 will cause the cam 46 to slide transversely of plunger 50 and to thereby cause swinging of the tool holder 30 so that the tools 37 and 38 will be moved axially of the work piece 12, reciprocation of member 10 also causing transverse movement of the tools relative to said work.

Means are provided for axially reciprocating plunger 50 to give axial movement to the tools 37 and 38 in addition to that caused by the cam 46 for the purpose of relieving the tools from the work piece surface when they are being retracted to initial cutting position. The plunger 50 is slidably mounted in the bushing 51 fixed in the housing 1 and prevented from rotating therein by means of a key 52 fixed in the plunger 50 and slidably engaging in the keyway 53 formed in the bushing 51. The opposite end of plunger 50 from end 49 is provided with a threaded portion 54 to which is applied an adjusting nut 55 which has its face 56 abutting against the face 57 of the bushing 51 whereby the extent of the projection of end 49 of the plunger toward the cam 46 can be easily selected. Normally the plunger is urged to the left (Figure I) by the spring 34 through the arrangement described thus disengaging the faces 56 and 57.

Hydraulically operated mechanism is provided for axially moving plunger 50 to the right to hold the faces 56 and 57 in contact during the cutting operation of the tools 37 and 38 on the work 12. This mechanism comprises a hydraulic cylinder 58 mounted on the housing 1 by suitable studs 59 and nuts 60 in which is reciprocatable a piston 61 having an integral piston rod 62 passing out through the usual packing 63 and gland 64 and abutting against the threaded end of the plunger 50. Appropriate fluid pressure lines 65 and 66 communicate with the respective chambers 67 and 68 whereby said piston 61 may be reciprocated in said cylinder to move the plunger 50 to the right (Figure I) or to allow the plunger 50 to return to the left under the influence of spring 34.

The cycle of operation of this tool feeding device is shown in Figures III to IX inclusive. For illustrative purposes I show the tool holder 30 with the tools 37 and 38 applied to machining the outside face 69 of the flange 70, chamfering the outer edge 71, and forming the recess or counterbore 72 in the face 69 of a work piece or crankshaft 12. The line 73 represents the surface of the work piece before being machined by the tools 37 and 38 in a manner described below:

In Figure III the tool holder 30 and tools 37 and 38 are in retracted or initial starting position A at which time cam 22 is to the right (Figure I) so that the block 10 is fully withdrawn from the axis 11 of the work thus causing the end 49 of plunger 50 to be in contact with portion 47 of cam 46. The piston 61 and its rod 62 are retracted to the left (Figure I) allowing the plunger to be moved axially to the left under the influence of the spring 34 as described.

At the beginning of the feeding cycle fluid pressure is applied through pipe 65 to move the piston 61 and thereby the plunger 50 to the right holding faces 56 and 57 in contact to swing the tool holder 30 to bring tools 37 and 38 into the position shown in Figure IV, the direction of such movement being indicated by arrow B.

The cam 22 then begins to move to the left (Figure I) to cause feeding of tool holder 30 toward the axis 11 of the work 12 whereupon the cam 46 moves relative to the end 49 of the plunger 50 so that the end 49, which was in contact with surface 47 of the cam 46 in initial starting position, moves over the projection 48a to contact surface 48. The combination of the movements caused by movement of cam 22 and the riding of the end 49 of plunger 50 over the projection 47 causes the tool holder 30 and tools 37 and 38 to travel relative to the work 12 in a direction indicated by arrow C to a position indicated in Figure V.

The cam 22 continues to move to the left to feed the tool holder 30 toward the axis of the work, the end 49 of plunger 50 sliding along surface 48 of cam 46 to maintain the tool holder properly axially positioned relative to the work piece 12. The tools 37 and 38 thus feed in a direction indicated by arrow D of Figure VI, the tip 37a of tool 37 machining the face 69 of the flange 70 and the tip 38a of tool 38 machining the recess or counterbore 72. Near the end of this feeding movement the edge 37b of tool 37 chamfers the edge 71 of the flange 70.

Upon the completion of the cutting operations of Figure VI, the tool holder 30 is retracted to the left (Figure VII) as indicated by arrow E by applying fluid pressure to pipe 66 to return the piston 61 to the left allowing the plunger 50 to be moved to the left by spring 34 to thereby retract the tools from the surface of the work piece 12.

The cam 22 is then returned to the right (Figure I) withdrawing the tool holder away from the axis of the work as indicated by arrow F of Figure VIII while the surface 48 of cam 46 slides along the end 49 of plunger 50 until the projection 48a is reached whereupon the tool holder travels in the direction indicated by arrow G to initial starting position A of Figure III.

The path of relative travel between the work piece and cutting tools is shown by the arrows B to G, inclusive. Movements B and E are caused by actuation of piston 61 in cylinder 58; movements D and F are caused by the movement of cam 22; and movements C and G are caused by the combined movements of the cam 22 and the cam 46 as described.

Having fully set forth and described my invention what I claim as new and desire to secure by Letters Patent is:

1. In a tool feeding mechanism for lathe, cam means for feeding a cutting tool perpendicular to the axis of rotation of a work piece in said lathe, cam means for feeding a cutting tool longitudinally of the axis of rotation of said work piece, and tool relief means for moving said cutting tool longitudinally of said axis of rotation when both of said cam means are rendered ineffective.

2. In a lathe, a frame, a tool slide mounted on said frame and reciprocatable perpendicular to the axis of rotation of a work piece in said lathe, a tool holder pivotally mounted on said slide, a cutting tool mounted on said tool holder, means for reciprocating said slide, and means for swinging said tool holder to move said cutting tool substantially axially of said work piece.

3. In a lathe, a frame, a tool slide mounted on said frame reciprocable perpendicular to the axis of rotation of a work piece in said lathe, a tool holder pivotally mounted on said slide, a cutting tool mounted on said tool holder, resilient means associated with said tool holder to swing said tool holder so as to move said tool axially away from said work piece, and means opposing said resilient means for swinging said tool holder so as to move said tool axially toward said work piece.

4. In a lathe, a frame, a tool slide mounted on said frame and reciprocatable perpendicular to the axis of rotation of a work piece in said lathe, cam means for reciprocating said slide, a tool holder pivotally mounted on said slide, a cutting tool mounted on said tool holder, resilient means associated with said tool holder to swing said tool holder so as to move said tool axially away from said work piece, cam means opposing said resilient means for swinging said tool holder so as to move said tool axially toward said work piece, and means for rendering said cam means effective or ineffective.

5. In a lathe, a frame, a tool slide mounted on said frame and reciprocatable perpendicular to the axis of rotation of a work piece in said lathe, cam means for reciprocating said slide, a tool holder pivotally mounted on said slide, a cutting tool mounted on said tool holder, resilient means associated with said tool holder to swing said tool holder so as to move said tool axially away from said work piece, cam means opposing said resilient means for swinging said tool holder so as to move said tool axially toward said work piece, tool relief means associated with said second mentioned cam means for swinging said tool holder to and from cutting position, means for actuating said tool relief means, and means for rendering said cam means effective or ineffective.

6. In a lathe, a frame, a housing mounted on said frame, a tool slide reciprocatable in said housing perpendicular to the axis of rotation of a work piece in said lathe, cam means mounted on said frame adapted to reciprocate said tool slide, a tool holder pivotally mounted on said slide, a cutting tool mounted on said tool holder, resilient means mounted in said tool slide adapted to normally swing said tool holder so as to move said tool axially away from said work piece, cam means opposing said resilient means for swinging said tool holder so as to move said tool axially toward said work piece, means for rendering said first mentioned cam means operative, said second mentioned cam means being rendered effective by the operation of said first mentioned cam means.

7. In a lathe, a frame, a housing mounted on said frame, a tool slide reciprocatable in said housing perpendicular to the axis of rotation of a work piece in said lathe, cam means mounted on said frame adapted to reciprocate said tool slide, a tool holder pivotally mounted on said slide, a cutting tool mounted on said tool holder, resilient means mounted in said tool slide adapted to normally swing said tool holder so as to move said tool axially away from said work piece, cam means opposing said resilient means for swinging said tool holder so as to move said tool axially toward said work piece, tool relief means cooperating with said second mentioned cam means for moving said cutting tool to and from cutting position axially of said work piece, hydraulic operating means for said tool relief means, means for rendering said first mentioned cam means operative, said second mentioned cam means being rendered effective by the operation of said first mentioned cam means.

8. In a tool feeding mechanism for lathe, means for feeding a cutting tool perpendicular to the axis of rotation of a work piece in said lathe, means for feeding a cutting tool longitudinally of the axis of rotation of said work piece, and tool relief means for moving said cutting tool longitudinally of said axis of rotation when both of said feeding means are rendered ineffective.

9. In a lathe adapted to machining the end portion of a work piece, means for chucking and rotating said work piece, means for moving appropriate cutting tools relative to an initial starting position axially of said work piece, means for feeding said cutting tools diagonally of the axis of said work piece for initial cutting operation and perpendicular to said axis to complete said cutting operation, and means for rendering said axially moving means operative when said feeding means is inoperative.

10. In a lathe adapted to machining the end portion of a work piece, means for chucking and rotating said work piece, means for moving appropriate cutting tools relative to an initial starting position axially of said work piece, means for feeding said cutting tools diagonally of the axis of said work piece for initial cutting operation and perpendicular to said axis to complete said cutting operation, means for reversing said feeding means, and means for rendering said axially moving means operative when said feeding means is reversed.

11. In a crankshaft lathe, means for machining the flange end of a crankshaft comprising, means for chucking and rotating a crankshaft in said lathe, means for moving appropriate cutting tools relative to an initial starting position axially of said work piece, means for feeding said cutting tools diagonally of the axis of rotation of said crankshaft to initially position said tools for facing the outside of said flange and machining the counterbore thereof and for feeding said cutting tools perpendicular to said axis to finish machine said face and counterbore and to chamfer said flange, means for causing rapid reverse of said feeding means, and means for rendering said axially moving means operative when said feeding means is inoperative.

12. In a crankshaft lathe, means for machining the flange end of a crankshaft comprising, means for chucking and rotating a crankshaft in said lathe, means for moving appropriate cutting tools from an initial starting position axially of said crankshaft to initial cutting position, means for feeding said cutting tools relative to said crankshaft whereby the outside face, the counterbore, and the chamfer may be machined on the flange of said crankshaft, means for retracting said cutting tools axially of said crankshaft from cutting position at the completion of said cutting operation, and means for rapidly returning said cutting tools to initial starting position.

13. In a crankshaft lathe, means for machining the flange end of a crankshaft comprising, means for chucking and rotating a crankshaft in said lathe, means for moving appropriate cutting tools from an initial starting position axially of said crankshaft to initial cutting position, means for feeding said cutting tools diagonally of the axis of rotation of said crankshaft to initially position said cutting tools on said flange end of said crankshaft, means for feeding said cutting tools perpendicular to said axis of said crankshaft whereby the outside face, the counterbore, and the chamfer may be machined on the flange of said crankshaft, means for retracting said cutting tools axially of said crankshaft from cutting position at the completion of said cutting operation, and means for rapidly returning said cutting tools to initial starting position.

WILLIAM F. GROENE.